(12) United States Patent  
Burton et al.

(10) Patent No.: US 6,495,755 B2  
(45) Date of Patent: Dec. 17, 2002

(54) SELF-LOCKING WIRING GROMMET

(75) Inventors: Stephen J. Burton, Fenton, MO (US); Michael T. Collins, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/843,352

(22) Filed: Apr. 26, 2001

(65) Prior Publication Data

US 2002/0157853 A1 Oct. 31, 2002

(51) Int. Cl.⁷ ................................................. H02G 3/18
(52) U.S. Cl. ................. 174/65 G; 174/152 G; 174/153 G; 174/65 R; 16/2.1
(58) Field of Search ............................. 174/65 R, 65 G, 174/151, 152 G, 153 G; 248/56; 16/2.1, 2.2; 179/65 R, 65 G

(56) References Cited

U.S. PATENT DOCUMENTS

| | | |
|---|---|---|
| 1,775,128 A | 9/1930 | Hunter |
| 1,830,276 A | 11/1931 | Hunter |
| 2,004,866 A | 6/1935 | Haldeman |
| 3,283,186 A | 11/1966 | Perry |
| 3,324,228 A | 6/1967 | Larsson |
| 3,384,393 A | 5/1968 | Horton et al. |
| 3,440,592 A | 4/1969 | Zelle |
| 3,482,128 A | 12/1969 | Keck et al. |
| 3,502,917 A | 3/1970 | Bizoe |
| 3,544,705 A | 12/1970 | Winston |
| 3,736,548 A | 5/1973 | Double |
| 3,814,961 A | 6/1974 | Nelson et al. |
| 3,858,151 A | * 12/1974 | Paskert ..................... 438/98 |
| 3,895,177 A | 7/1975 | Muslin |
| 3,992,044 A | 11/1976 | Muslin |
| 4,101,794 A | 7/1978 | Miller |
| 4,103,101 A | 7/1978 | Maier |
| 4,205,246 A | 5/1980 | Wise et al. |

(List continued on next page.)

FOREIGN PATENT DOCUMENTS

| | | |
|---|---|---|
| DE | 1125027 | 3/1962 |
| DE | 7705795 | 8/1977 |
| DE | 29718252 | 1/1998 |
| JP | 55-125051 A | 9/1980 |
| JP | 56-41746 A | 4/1981 |
| JP | 11203972 | 1/1998 |
| SE | 200 456 | 12/1965 |
| SU | 1422282 | 9/1988 |

*Primary Examiner*—Anthony Dinkins  
*Assistant Examiner*—Dhiru R Patel  
(74) *Attorney, Agent, or Firm*—Thompson Coburn LLP

(57) ABSTRACT

A self-locking wiring grommet that is inserted into a notch at an edge of a clamshell housing of an electrical device has a pair of resilient arms that flex toward each other as the grommet is inserted into the notch and then spring outwardly away from each other to engage with a perimeter flange at the edge of the housing to hold the grommet in the housing notch without the need for separate fasteners.

32 Claims, 3 Drawing Sheets

U.S. PATENT DOCUMENTS

| | | |
|---|---|---|
| 4,232,712 A | 11/1980 | Squires |
| 4,248,459 A | 2/1981 | Pate et al. |
| 4,302,035 A | 11/1981 | Ochwat |
| 4,494,779 A | 1/1985 | Neff et al. |
| 4,523,117 A | 6/1985 | Daniels |
| 4,585,964 A | 4/1986 | Hildebrandt |
| 4,616,105 A | 10/1986 | Borsh |
| 4,626,720 A | 12/1986 | Fukasaku et al. |
| 4,711,974 A | 12/1987 | Borsh |
| 4,781,726 A | 11/1988 | Fisher et al. |
| 4,851,725 A | 7/1989 | Keck |
| 4,864,080 A | 9/1989 | Fochler et al. |
| 4,880,387 A * | 11/1989 | Stikeleather et al. .. 174/65 R X |
| 4,897,571 A | 1/1990 | Isozumi |
| 4,965,478 A | 10/1990 | Kobayashi et al. |
| 5,006,742 A | 4/1991 | Strobl et al. |
| 5,015,894 A | 5/1991 | Crow et al. |
| 5,086,243 A | 2/1992 | Hofmann |
| 5,086,244 A | 2/1992 | Isozumi |
| 5,126,608 A | 6/1992 | Sogabe et al. |
| 5,148,073 A | 9/1992 | Tamura |
| 5,189,258 A | 2/1993 | Pratesi |
| 5,192,888 A | 3/1993 | Fleer |
| 5,204,566 A | 4/1993 | Borgen et al. |
| 5,264,816 A | 11/1993 | Degenhart et al. |
| 5,287,028 A | 2/1994 | Suzuki et al. |
| 5,350,960 A | 9/1994 | Kiri et al. |
| 5,414,318 A | 5/1995 | Shimizu et al. |
| 5,519,273 A | 5/1996 | Keck |
| 5,522,659 A | 6/1996 | Penaranda et al. |
| 5,567,916 A * | 10/1996 | Napiorkowski et al. 174/153 G |
| 5,621,265 A | 4/1997 | Abadia |
| 5,777,409 A | 7/1998 | Keck |
| 6,080,933 A * | 6/2000 | Gretz ....................... 174/65 R |
| 6,081,964 A * | 7/2000 | Mori ........................... 16/2.2 |
| 6,143,983 A | 11/2000 | Burton et al. |
| 6,211,464 B1 * | 4/2001 | Mochizuki et al. ....... 174/65 G |

* cited by examiner

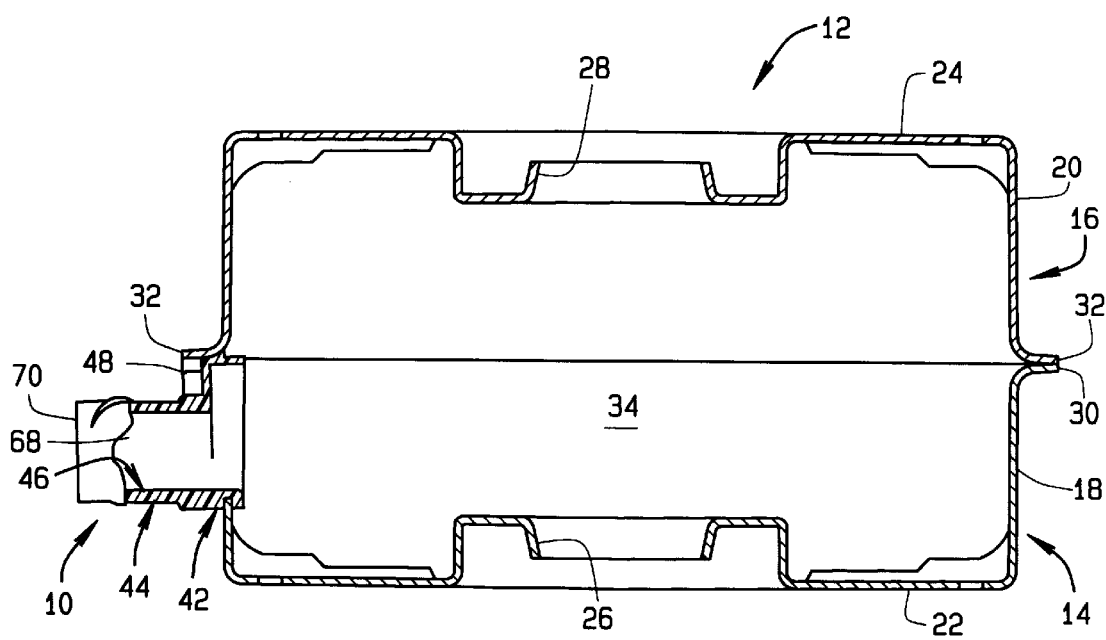
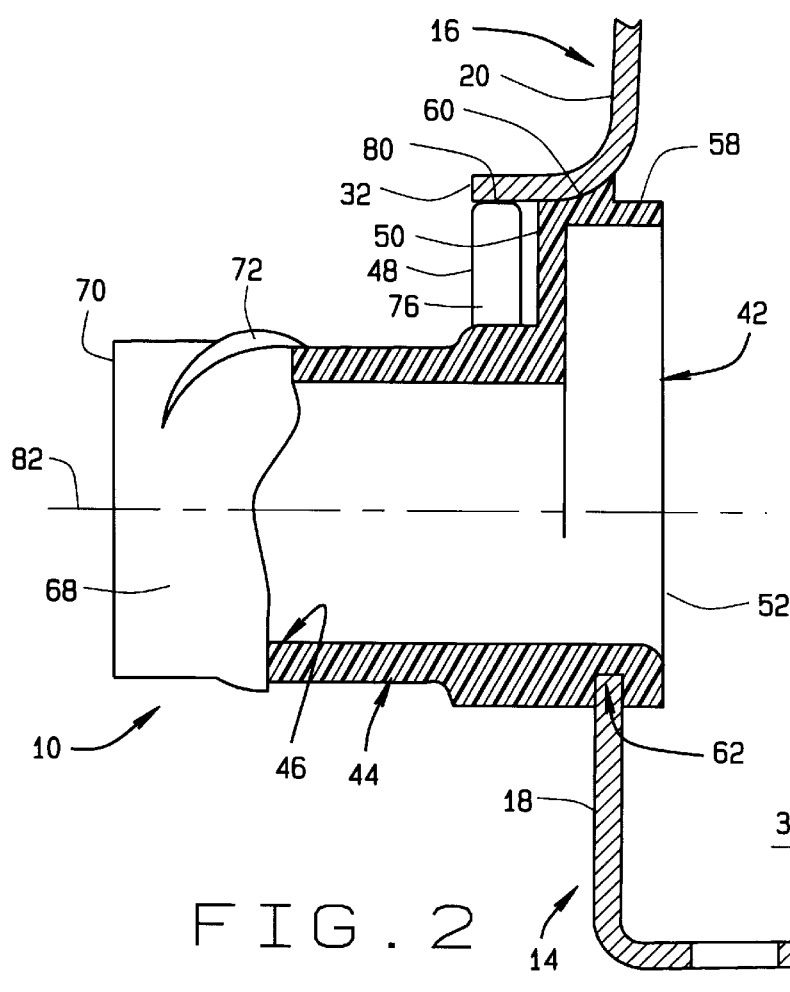

SELF-LOCKING WIRING GROMMET

BACKGROUND OF THE INVENTION

(1) Field of the Invention

The present invention pertains to a self-locking wiring grommet that is attachable to an opening in a housing of an electrical device. The grommet protects the electrical wiring of the device passed through the housing opening from being scraped or cut by the edge of the opening, and seals the housing opening against dirt, dust, moisture or other matter that could detrimentally affect the operation of the electrical device. In particular, the present invention pertains to a self-locking wiring grommet that is inserted into a notch at an edge of a clamshell housing of an electrical device to protect the wiring of the device, where the grommet has a pair of resilient arms that flex toward each other as the grommet is inserted into the notch and then spring outwardly away from each other to engage with a perimeter flange at the edge of the housing to hold the grommet in the housing notch without the need for separate fasteners.

(2) Description of the Related Art

Electrical devices, for example electric motors, are often contained in metal housings that provide a supporting base for the device and protect the component parts of the device. The housing of the electrical device is provided with an opening and the wiring of the electrical device is passed through the opening to the exterior of the housing. To protect the insulation of the electrical wiring of the device, a grommet is usually attached to the edge portions of the housing surrounding the housing opening. In this way the grommet protects the wiring insulation from being scraped or cut by the metal edge of the housing opening.

Because the attachment of the grommet to the electrical device housing requires additional manufacturing steps that increase the cost of manufacturing the device, different types of housings and grommets have been designed whereby the grommet can be easily attached to the device housing without the need for separate fasteners. One example is employed on the cylindrical shell housing of an electric motor that is used with a pair of end shields that are secured in the openings at the opposite ends of the cylindrical shell and support bearings of the motor shaft. A notch is formed in one of the ends of the cylindrical shell and a grommet, through which the wiring of the motor is passed, is inserted into the notch. One of the end shields is attached to the end of the cylindrical shell over the notch. This end shield holds the grommet in the notch without the need for separate fasteners securing the grommet to the notch.

Although this design of motor housing enables the wiring grommet to be attached to the housing without the need for separate fasteners and without the additional manufacturing step of attaching the grommet by fasteners, it also has disadvantages. For example, when the wiring grommet is inserted into the notch it must be held in the notch until the end shield is attached to the cylindrical housing shell to secure the grommet in the notch. During manufacture of the motor, it is possible for the grommet to fall out of the notch, requiring its reinsertion and increasing the manufacturing time for the motor and its associated costs.

SUMMARY OF THE INVENTION

The wiring grommet of the present invention overcomes the disadvantages associated with prior art wiring grommets by providing a self-locking feature on a wiring grommet that holds the grommet in a notch of an electrical device housing. The self-locking wiring grommet of the invention is designed for use with a clamshell motor housing. Clamshell motor housings typically have two housing sections that are substantially the same. Each housing section has a generally cup-shaped configuration with a cylindrical side wall and a circular end wall. A motor shaft opening is provided at the center of the end wall. The side wall has a peripheral edge that is formed as a radially out-turned flange. The flanges of the two clamshell housing sections are secured together by rivets or other equivalent means, with the motor or other electrical device enclosed in the interior of the two clamshell housing sections.

To accommodate the wiring grommet of the invention, a notch is formed into a side wall of one of the clamshell housing sections. The notch forms an opening in the housing section side wall that is dimensioned to receive the grommet. The notch also forms a gap in the peripheral flange of the housing section adjacent the notch. The opposite housing section is not provided with a notch.

The self-locking wiring grommet of the invention is basically comprised of a base dimensioned to be inserted into the housing section notch, a tubular portion projecting from the base and designed to be attached to a wiring conduit, a center bore through the base and tubular portion, and in the preferred embodiment, a pair of resilient arms that project outwardly from the grommet. The base has a peripheral surface that is shaped complementary to the configuration of the notch formed in the housing section. A slot is recessed into a portion of the peripheral surface and is dimensioned to receive a portion of the motor housing side wall surrounding the notch. The base of the grommet is inserted into the notch with an interior surface of the base facing the interior volume of the housing section, an exterior surface of the base facing away from the housing side wall, the tubular portion of the grommet projecting outwardly from the base exterior surface, and with a sealing portion of the base peripheral surface spanning across the gap in the housing section peripheral flange created by the notch. As the grommet base is inserted into the notch, the resilient arms pass through the gap in the housing peripheral flange and resiliently flexed toward each other. As the distal ends of the arms pass through the gap, the resiliency of the arms causes them to flex outwardly away from each other and engage against the housing section peripheral flange on opposite sides of the gap, thereby securely holding the grommet in the notch without the need for separate fasteners and without the need for the other housing section being attached to the housing section with the notch. With the resilient arms holding the grommet in the housing section notch, the wiring of the electrical device can be passed through the bore of the grommet. The other housing section can then be attached to the housing section with the notch without the risk of the grommet separating from the notch prior to the attachment of the other housing section.

BRIEF DESCRIPTION OF THE DRAWINGS

Further features of the invention are set forth in the following detailed description of the preferred embodiment of the invention and in the drawing figures wherein:

FIG. 1 is a side, sectioned view of a clamshell motor housing employing the self-locking wiring grommet of the invention;

FIG. 2 is a partial, sectioned view of the wiring grommet and portions of the motor housing of FIG. 1;

DETAILED DESCRIPTION OF THE PREFERRED EMBODIMENT

Figure 3:
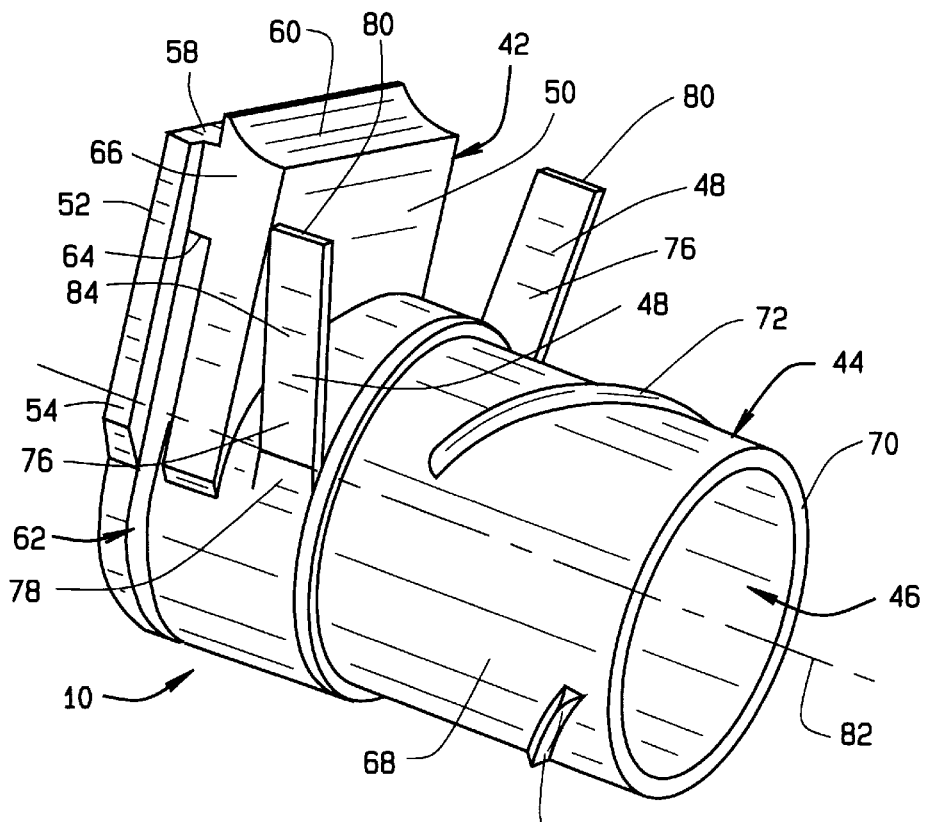
FIG. 3 is a perspective view of the self-locking wiring grommet.

The self-locking wiring grommet 10 of the present invention is designed for use with clamshell housings for electrical devices such as that shown in FIG. 1. The clamshell housing is described as an electric motor housing, but the housing could be employed to enclose other electrical devices and the self-locking wiring grommet is not limited to use with electric motor housings. The example of the clamshell housing shown in FIG. 1 is basically comprised of a first 14 and second 16 housing section that are substantially the same. The two housing sections are typically stamped from sheet metal. Each housing section 14, 16 is stamped in a generally cup-shaped configuration with cylindrical side walls 18, 20 and a circular end wall 22, 24. Shaft openings 26,28, for example for the shaft of an electric motor contained in the housing, are formed at the centers of the respective end walls 22, 24. The housing section side walls have peripheral edges that are formed as radially out-turned flanges 30, 32. The peripheral flanges 30, 32 of the two housing sections are secured together by rivets or other equivalent means enclosing the motor (not shown) or other electrical device within the interior volume 34 of the housing.

Figure 9:
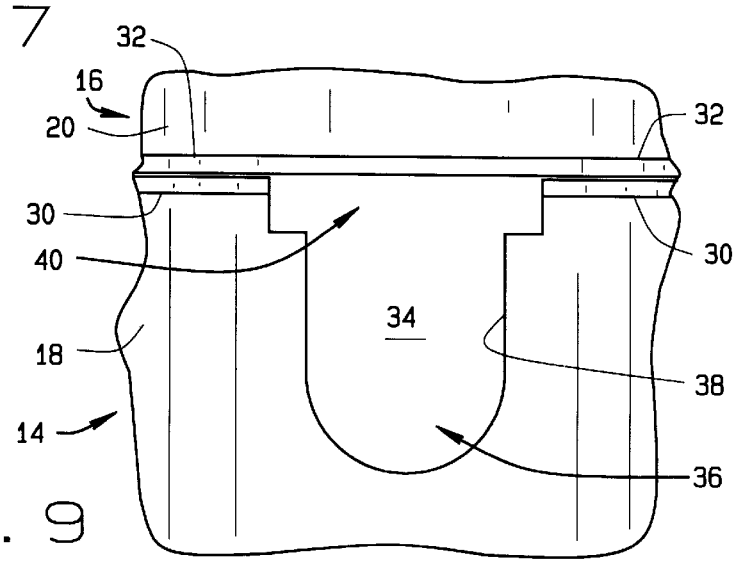
FIG. 9 is a partial, side view of a notch opening formed in the motor housing.

To accommodate the wiring grommet 10 of the invention on the housing, a notch 36 is formed into the side wall 18 of one of the housing sections. The notch 36 can best be seen in FIG. 9 which is a partial view of the side walls 18, 20 of the two connected housing sections 14, 16 from the exterior of the housing. The notch 36 forms an opening into the side wall 18 of the first housing section 14 that is dimensioned to receive and hold the grommet 10. As seen in FIG. 9, the notch 36 has a perimeter edge 38 having a general U-shaped configuration. The notch 36 is also formed in the peripheral flange 30 of the first housing section forming a gap 40 in the peripheral flange. The second housing section 16 is not provided with a notch and the peripheral flange 32 of the second housing section extends across the gap 40 when the two housing sections are connected together.

The self-locking wiring grommet 10 of the invention is preferably constructed of an insulating material such as plastic. The grommet is basically comprised of a base 42, a tube or tubular portion 44, a center bore 46 that passes through the base and the tube and in the preferred embodiment, a pair of resilient arms 48. In the preferred embodiment these component parts of the grommet are molded as a single piece.

The base 42 and notch 36 have configurations that are complementary to each other. The base has a front or exterior surface 50 that faces the exterior of the motor housing and an opposite rear or interior surface 52 that faces the interior of the motor housing. A peripheral surface 54 extends around the base between the exterior 50 and interior 52 surfaces. The base peripheral surface 54 includes a side surface 56 that extends around the perimeter edge 38 of the notch, and a spacing surface 58 and sealing surfaces 60 that extend across the gap 40 of the notch. A slot or groove 62 is formed into the side surface 56 of the base. The slot 62 has a U-shaped configuration that conforms to the portion of the notch perimeter edge 38 also having the U-shaped configuration. As can be seen in FIGS. 3–6, the slot 62 has a pair of ends 64 where the opposite ends of the slot terminate, leaving portions 66 of the base side surface 56 between the ends 64 of the slot and the spacing surface 58 of the base. The spacing surface 58 is a flat surface that extends from the base interior surface 52 toward the base exterior surface 50 to a position over the slot 62 where it meets with the base sealing surface 60. As best seen in FIG. 2, the base sealing surface 60 has a curved configuration that is complementary to the curved configuration of the peripheral flange 32 of the second housing section 16.

The tube 44 projects forwardly from the base exterior surface 50 to an annular distal end 70 of the tube. The tube has an exterior surface 68 with a cylindrical configuration. The bore 46 passes through the base from the base interior surface 42 and through the tube 44 to the distal end 70 of the tube. A catch in the form of a pair of spiral threads 72 is provided on the tube exterior surface 68. The catch 72 is employed in securing a conduit for electrical wiring on the tube exterior surface 68.

The pair of resilient arms 48 extend outwardly from the grommet near the juncture of the tube 44 with the base 42. Each of the arms 48 has an elongate length 76 with opposite proximal 78 and distal 80 ends. Each of the arms 48 are joined to the grommet at their proximal ends 78 adjacent the juncture of the tube 44 with the base 42. With the grommet bore center axis 82 defining axial and radial directions relative to the grommet, the lengths 76 of the arms are spaced axially in front of the exterior surface 50 of the base. As the arms extend along their lengths 76 from their proximal ends 78 to their distal ends 80, they angle slightly away from each other. This positions the distal ends 80 of the arms outside the width of the base 42 and radially spaced from the tube. The arm distal ends 80 are spaced a distance from each other that is slightly larger than the distance of the gap 40 in the peripheral flange 30 of the first housing section 14. The lengths of the arms also positions their distal ends 80 just short of a plane occupied by the spacing surface 58 of the base of the grommet. The configurations of the arms 48, together with the resilient characteristics of the material employed in forming the grommet 10, gives each of the arms a resilience that enables them to be flexed toward each other by a force applied to the outside surfaces 84 of the arms and then to return to their at rest positions shown in the drawing figures when the force is removed.

Figure 4:
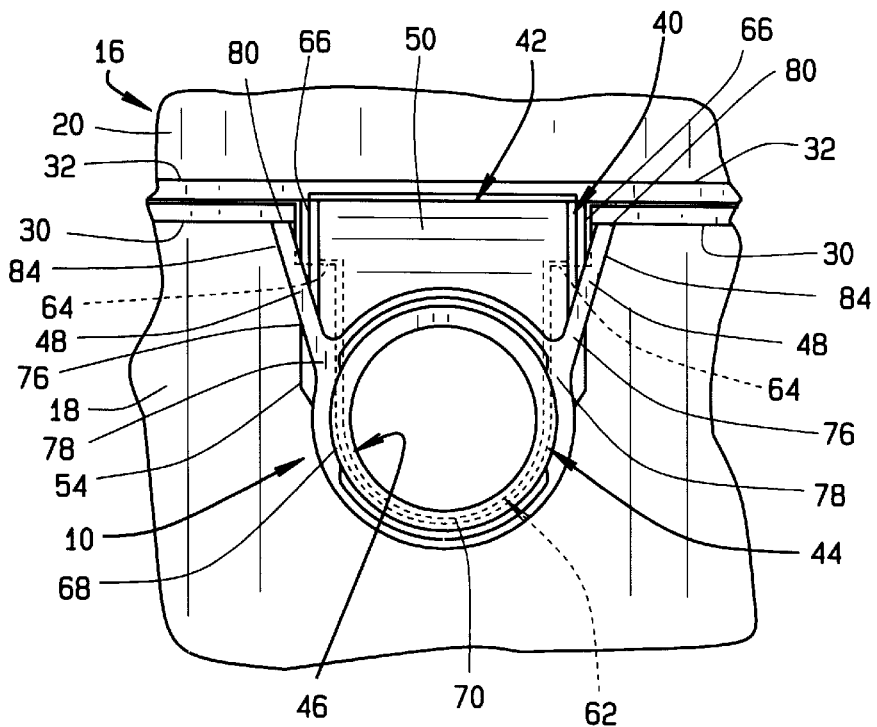
FIG. 4 is a partial view of the self-locking wiring grommet attached to the motor housing.
Figure 5:
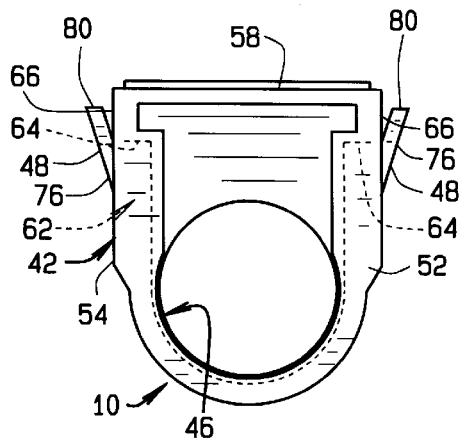
FIG. 5 is an end elevation view of the self-locking wiring grommet.
Figure 6:
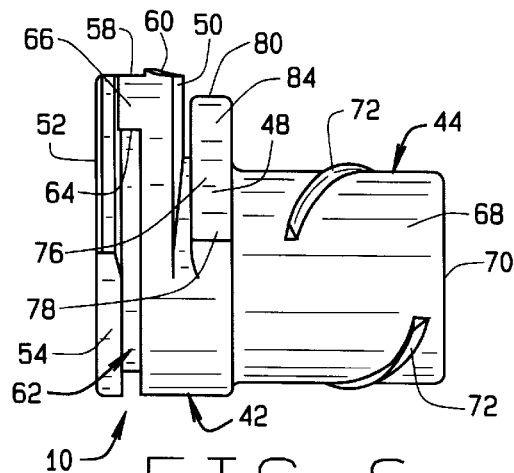
FIG. 6 is a side elevation view of the grommet.
Figure 7:
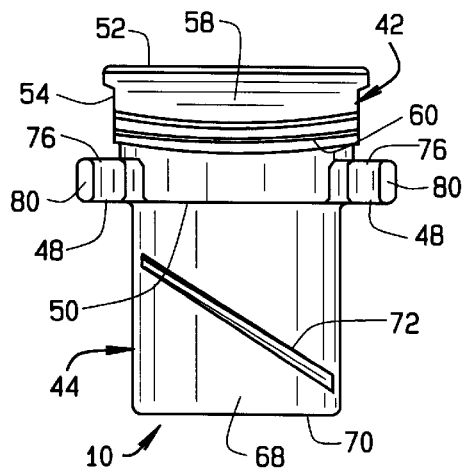
FIG. 7 is a top plan view of the grommet.
Figure 8:
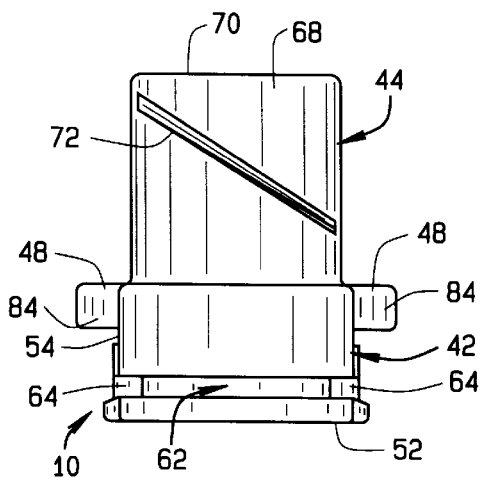
FIG. 8 is a bottom plan view of the grommet.

The grommet 10 is attached to the first housing section 14 with the two housing sections separated from each other. The housing base 42 is positioned adjacent the housing section notch 36 with the base interior surface 52 facing toward the housing section interior volume 34. The base 42 is move toward the notch 36 with the base slot 62 positioned to receive the portion of the housing side wall 18 adjacent the notch perimeter edge 38. As the grommet is inserted into the notch in this manner, the outside surfaces 84 of the two resilient arms 48 will come into contact with the peripheral flange 30 of the first housing section on opposite sides of the flange gap 40. As the grommet is continued to be pushed into the notch, the ends of the flange 30 on opposite sides of the gap 40 push the resilient arms toward each other causing the arm distal ends 80 to flex toward each other. This continues until the arm distal ends 80 pass through the gap 40 in the peripheral flange 30 of the first housing section, at which point the resiliency of the arms 48 causes them to snap back to their at rest configuration. At this point, the grommet 10 is completely inserted into the notch 36 and the arm distal ends 40 engage against the peripheral flange 30 of the first housing section just outside the gap 40 in the peripheral flange as seen in FIG. 4. The engagement of the arm distal ends 80 against the peripheral flange 30 of the first housing section securely holds the grommet 10 in the notch 36 without the need for additional fasteners. Furthermore, it can be seen that the engagement of the arm distal ends 80 with the peripheral flange 30 will hold the grommet 10 in the notch 36 prior to the attachment of the two housing sections 14, 16 to each other. Thus, the grommet 10 can be attached to the first housing section 14 and the wiring of the electrical device (not shown) to be enclosed in the housing can be passed through the grommet bore 46 without the risk of the grommet separating from the first housing section before the second housing section 16 can be attached. When the second housing section is attached to the first, the grommet sealing surface 60 follows the curvature of the second housing section peripheral flange 32 and functions as a seal with the flange. The curvature of the sealing surface 60 functions as a seal between the exterior and interior of the motor housing without requiring that the sealing surface 60 actually engage with the second housing section flange 32.

While the present invention has been described by reference to a specific embodiment, it should be understood that modifications and variations of the invention may be constructed without departing form the scope of the invention defined in the following claims.

What is claimed:

1. A wiring grommet that is attachable to a motor housing in a notch formed in an edge of the motor housing and is attachable to a conduit to thereby attach the conduit to the motor housing, the wiring grommet comprising:

a base of the grommet having opposite exterior and interior surfaces and a peripheral surface that extends around the base between the exterior and interior surfaces, and a slot in the peripheral surface that is dimensioned to be inserted into the notch and receive portions of the motor housing in the slot when attaching the grommet to the motor housing;

a catch of the grommet that is attachable to a conduit; and an arm of the grommet that is positioned on the grommet where the arm will engage with the motor housing when the base is attached to the opening of the motor housing and thereby hold the grommet attached to the motor housing.

2. The grommet of claim 1, wherein:

the arm has an elongate length with opposite proximal and distal ends and projects from the grommet at its proximal end to its distal end with the length of the arm and the distal end of the arm being spaced from the base of the grommet.

3. The grommet of claim 2, wherein:

the length of the arm positions the distal end of the arm relative to the base where the distal end of the arm will engage with the motor housing when the base is attached to the opening of the motor housing and thereby hold the grommet attached to the motor housing.

4. The grommet of claim 3, wherein:

the grommet is attached to the motor housing solely by the distal end of the arm engaging with the motor housing when the base is attached to the motor housing.

5. The grommet of claim 2, wherein:

the arm is one arm of a pair of like arms that are each positioned on the grommet where the distal end of each arm will engage with the motor housing when the base of the grommet is attached to the opening of the motor housing and thereby hold the grommet attached to the motor housing.

6. The grommet of claim 5, wherein:

the pair of arms are positioned on the grommet where the length of each arm will extend along an opposite side of the motor housing opening when the grommet is attached to the opening.

7. The grommet of claim 5, wherein:

the pair of arms are positioned on the grommet where the distal ends of the arms will engage with the motor housing on opposite sides of the motor housing opening when the base of the grommet is attached to the opening of the motor housing.

8. The grommet of claim 1, wherein:

the arm is one arm of a pair of arms that are each positioned on the grommet where each arm will engage with the motor housing when the base is attached to the opening of the motor housing and thereby hold the grommet attached to the motor housing.

9. The grommet of claim 8, wherein:

the pair of arms are positioned on the grommet where each arm will engage with the motor housing on opposite sides of the opening when the grommet is attached to the opening of the motor housing.

10. The grommet of claim 8, wherein:

the pair of arms project from the grommet to distal ends of the arms that are each spaced from the base and from the catch of the grommet.

11. A wiring grommet that is attachable to a motor housing and to a conduit to thereby attach the conduit to the motor housing, the wiring grommet comprising: a base of the grommet that is attachable to an opening of the motor housing; a tube on the base, the tube having an exterior surface; a catch on the tube exterior surface that is attachable to a conduit; an arm of the grommet that is positioned on the grommet where the arm will engage with the motor housing when the base is attached to the opening of the motor housing and thereby hold the grommet attached to the motor housing, the arm is one arm of a pair of arms that are each positioned on the grommet where each arm will engage with the motor housing when the base is attached to the opening of the motor housing and thereby hold the grommet attached to the motor housing, the pair of arms projecting from the grommet to distal ends of the arms that are each spaced from the base and from the catch of the grommet; and, the grommet is attached to the motor housing solely by the pair of arms engaging with the motor housing.

12. A grommet that is attachable to a motor housing in a notch formed in an edge of the motor housing and is attachable to a conduit to thereby connect the conduit to the motor housing, the grommet comprising:

a base of the grommet having opposite exterior and interior surfaces and a peripheral surface that extends around the base between the exterior and interior surfaces, and a slot in the peripheral surface that is dimensioned to be inserted into the notch and receive portions of the motor housing in the slot when attaching the grommet to the motor housing;

a tube of the grommet that projects outwardly from the base exterior surface;

a bore that extends through the tube and through the base; and an arm that projects from the grommet to a position where the arm will engage with the edge of the motor housing when the base is inserted into the notch of the motor housing and thereby hold the grommet attached to the motor housing.

13. The grommet of claim 12, wherein:

the bore has an axis that extends through the tube and the base and defines an axial direction and a radial direction relative to the grommet, and the arm projects from the grommet to a distal end of the arm that is axially spaced from the base and radially spaced from the tube.

14. The grommet of claim 13, wherein:

the arm is one of a pair of like arms.

15. The grommet of claim 12, wherein:

the arm has an elongate length with opposite proximal and distal ends with the proximal end of the arm being on the grommet and the length of the arm and the arm distal end being spaced from the grommet.

16. The grommet of claim 15, wherein:

the arm is one arm of a pair of arms that project from the grommet to positions where the arms will engage with the edge of the motor housing when the grommet base is inserted into the notch of the motor housing and thereby hold the grommet attached to the motor housing.

17. The grommet of claim 15, wherein:

the arm is one of a pair of arms that project from the grommet to the distal ends of the arms and the distal ends of the arms are positioned on opposite sides of the grommet base.

18. The grommet of claim 15, wherein:

the arm is one arm of a pair of arms that are oriented on the grommet where the distal ends of the arms will engage with the edge of the motor housing on opposite sides of the notch when the grommet base is inserted into the notch of the motor housing and thereby hold the grommet attached to the motor housing.

19. A grommet assembly for attaching a conduit to a motor, the grommet assembly comprising: a motor housing having an edge and a notch formed in the edge; and a grommet having a base that is inserted into the motor housing notch, a tube on the base, the tube having an exterior surface; a catch on the tube exterior surface that is attachable to the conduit, and an arm on the grommet that projects from the grommet and engages with the motor housing edge to hold the grommet in the motor housing notch.

20. The grommet of claim 19, wherein:

the arm projects from the grommet to a distal end of the arm that is spaced from the base and the catch of the grommet.

21. The grommet of claim 19, wherein:

the arm has an elongate length with opposite proximal and distal ends with the proximal end of the arm joining the arm to the grommet and the distal end of the arm engaging with the motor housing edge.

22. The grommet of claim 21, wherein:

the length of the arm and the arm distal end are both spaced from the grommet base.

23. The grommet of claim 21, wherein:

a bore extends through the base and has a center axis that defines an axial direction and a radial direction relative to the grommet and the arm distal end is axially spaced from the base and radially spaced from the bore.

24. The grommet of claim 19, wherein:

the arm is one of a pair of arms that each project from the grommet and engage with the motor housing edge to hold the grommet in the motor housing notch.

25. The grommet of claim 24, wherein:

the pair of arms engage with the motor housing edge on opposite sides of the notch.

26. The grommet assembly of claim 19, wherein:

the grommet base has opposite interior and exterior surfaces;

the grommet has a tube with an interior bore having a bore center axis that project axially outwardly from the base exterior surface; and, the arm is on the tube and projects from the tube.

27. The grommet assembly of claim 26, wherein:

the arm is one of a pair of arms on the tube that project from the tube.

28. The grommet assembly of claim 26, wherein:

the arm projects from the tube over a portion of the base exterior surface.

29. The grommet assembly of claim 26, wherein:

the arm is one of a pair of arms on the tube that project from the tube and extend over portions of the base exterior surface.

30. The grommet assembly of claim 29, wherein:

the grommet base has opposite exterior and interior surfaces and a peripheral surface that extends around the base between the exterior and interior surfaces, and the peripheral surface is inserted into the motor housing notch and engages with the motor housing.

31. The grommet assembly of claim 29, wherein:

the motor housing has a side wall with the edge on the side wall and the notch formed in the side wall from the edge.

32. The grommet assembly of claim 31, wherein:

the motor housing has a flange that extends outwardly at an angle relative to the side wall and the notch, the motor housing edge has a portion on the flange and the arm projects from the grommet and engages with the flange to hold the grommet in the motor housing notch.

* * * * *